United States Patent
Zhang et al.

(10) Patent No.: US 11,227,186 B2
(45) Date of Patent: Jan. 18, 2022

(54) METHOD AND DEVICE FOR TRAINING IMAGE RECOGNITION MODEL AND RELATED DEVICE

(71) Applicant: BEIJING BAIDU NETCOM SCIENCE AND TECHNOLOGY CO., LTD., Beijing (CN)

(72) Inventors: Jiadong Zhang, Beijing (CN); Chao Li, Beijing (CN); Guoyi Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 16/828,845

(22) Filed: Mar. 24, 2020

(65) Prior Publication Data
US 2020/0349389 A1    Nov. 5, 2020

(30) Foreign Application Priority Data
Apr. 30, 2019    (CN) .......................... 201910363927.4

(51) Int. Cl.
*G06K 9/46*    (2006.01)
*G06K 9/62*    (2006.01)
*G06T 7/73*    (2017.01)

(52) U.S. Cl.
CPC ............ *G06K 9/6256* (2013.01); *G06K 9/46* (2013.01); *G06K 9/6202* (2013.01);
(Continued)

(58) Field of Classification Search
CPC ...... G06K 9/6256; G06K 9/46; G06K 9/6202; G06K 9/6215; G06K 2209/21; G06T 7/73; G06T 2207/20081
(Continued)

(56) References Cited

U.S. PATENT DOCUMENTS 6,618,375 B2 * 9/2003 Rezaiifar .............. H04L 1/1841
370/394
8,718,444 B2 * 5/2014 Miura ................ H04N 5/44543
386/248
(Continued)

FOREIGN PATENT DOCUMENTS

CN    1967526 A    5/2007
CN    101038668 A    9/2007
(Continued)

OTHER PUBLICATIONS

Chinese Patent Application No. 201910363927.4 Office Action dated Sep. 24, 2020, 9 pages.
(Continued)

*Primary Examiner* — Sheela C Chawan
(74) *Attorney, Agent, or Firm* — Lathrop GPM LLP

(57) ABSTRACT

The present disclosure relates to a method and a device for training an image recognition model and a related device. The method includes: extracting sub-image feature data from a detection frame sub-image of an input image; determining element feature data matching the sub-image feature data from an index element database; and outputting images related to the element feature data as training images for training the image recognition model. The index element database is built in advance based on a plurality of element feature data extracted from a plurality of candidate images.

15 Claims, 3 Drawing Sheets

(52) U.S. Cl.
CPC .............. *G06K 9/6215* (2013.01); *G06T 7/73* (2017.01); *G06K 2209/21* (2013.01); *G06T 2207/20081* (2013.01)

(58) Field of Classification Search
USPC ....... 382/100, 159, 181, 190, 195, 141, 232, 382/243, 209, 276, 285, 233
See application file for complete search history.

(56) References Cited

U.S. PATENT DOCUMENTS

| | | | |
|---|---|---|---|
| 9,171,230 B2 | 10/2015 | Jiang et al. | |
| 2007/0230799 A1* | 10/2007 | Shniberg | G06F 16/5854 382/224 |
| 2016/0275642 A1* | 9/2016 | Abeykoon | G06K 9/00711 |
| 2017/0061245 A1* | 3/2017 | Cheng | G06K 9/00295 |
| 2018/0032796 A1* | 2/2018 | Kuharenko | G06F 16/5838 |

FOREIGN PATENT DOCUMENTS

| | | |
|---|---|---|
| CN | 102915372 A | 2/2013 |
| CN | 103049446 A | 4/2013 |
| CN | 104933688 A | 9/2015 |
| CN | 106570015 A | 4/2017 |
| CN | 108319938 A | 7/2018 |
| CN | 108763580 A | 11/2018 |
| CN | 108875814 A | 11/2018 |

OTHER PUBLICATIONS

Chinese Patent Application No. 201910363927.4 English translation of Office Action dated Sep. 24, 2020, 9 pages.

\* cited by examiner

METHOD AND DEVICE FOR TRAINING IMAGE RECOGNITION MODEL AND RELATED DEVICE

CROSS REFERENCE

This application claims priority and benefits to Chinese Application No. 201910363927.4, filed on Apr. 30, 2019, the entire content of which is incorporated herein by reference.

TECHNICAL FIELD

The present disclosure mainly relates to an information processing field, and more particularly, to a method and a device for training an image recognition model and a related device (such as an electronic device and a computer readable storage medium).

BACKGROUND

With the popularity of deep learning technologies in recent years, neural networks are frequently applicable for tasks related to computer vision training. For example, object (target) detection is a relatively classic problem, which is tasked to label a position of an object in an image using a detection frame and identify a type of the object.

SUMMARY

The present disclosure provides a method for training an image recognition model. The method includes: extracting sub-image feature data from a detection frame sub-image of an input image; determining element feature data matching the sub-image feature data from an index element database; and outputting images related to the element feature data as training images for training the image recognition model. The index element database is built in advance based on a plurality of element feature data extracted from a plurality of candidate images.

The present disclosure also provides a method for image recognition. The method includes: performing image recognition based on an image recognition model. The image recognition model is trained based on a method for training an image recognition model described above.

The present disclosure also provides a device. The device includes one or more processors and a storage device configured to store one or more programs. When the one or more programs are executed by the one or more processors, the one or more processors are caused to implement the method for training an image recognition model and the method for image recognition described above.

The present disclosure also provides a computer-readable storage medium having a computer program stored thereon. When the computer program is executed by a processor, the method for training an image recognition model and the method for image recognition described above are implemented.

It should be understood, descriptions herein are not intended to limit the present disclosure, nor is it intended to limit the scope of the present disclosure. Additional features of the present disclosure will become readily understood from following descriptions.

BRIEF DESCRIPTION OF THE DRAWINGS

The above and/or additional aspects and advantages of embodiments of the present disclosure will become apparent from the following descriptions made with reference to the drawings, the same or similar reference numerals indicate the same or similar elements in the drawings, in which.

DETAILED DESCRIPTION

Figure 1:
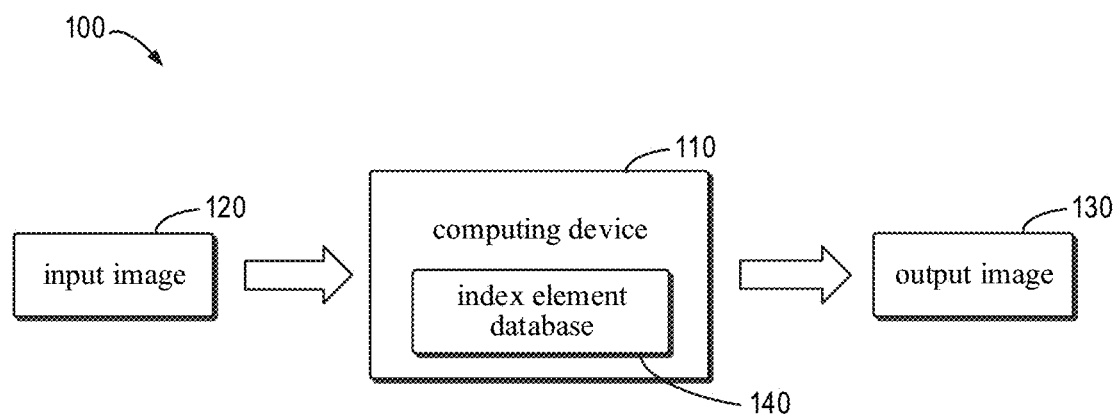
FIG. 1 is a schematic diagram illustrating an exemplary environment for implementing embodiments of the present disclosure.

Embodiments of the present disclosure are described in more detail below with reference to the accompanying drawings. Although the drawings include certain embodiments of the present disclosure, it should be understood that the present disclosure may be implemented in various forms and should not be construed as limited to the embodiments set forth herein, but rather these embodiments are provided for a more thorough and complete understanding of the present disclosure. It should be understood, the drawings and embodiments of the present disclosure are for exemplary purposes only, and are not intended to limit the protection scope of the present disclosure.

In the description of the embodiments of the present disclosure, the term "including" and similar terms should be understood as inclusive, that is, "including but not limited to". The term "based on" should be understood as "based at least in part on". The term "one embodiment" or "the embodiment" should be understood as "at least one embodiment". The terms such as "first", and "second" may refer to different objects or the same object. Additional explicit and implicit definitions may be included below.

In related arts, even if the object detection technologies based on deep learning are well developed, the cost of obtaining training data for the object detection is high. Before training an image recognition model, it is generally required to obtain available training data by filtering and cleaning a public set of data, or directly perform manual labeling, which is tediously and occupies considerable time and labor costs in a model iteration process.

As mentioned above, a method for training an image recognition model is needed to rapidly and efficiently obtain low-cost and all-embracing training data and to reduce time and labor cost of training the image recognition model. Requirements to the training data are high for the object detection. At present, some traditional methods exist. For example, by digging or manually collecting images labelled with related text (i.e., unlabeled images), and by manually cleaning data and labeling detection frames, a set of images each carrying a position of the detection frame and a type of the detection frame is generated. In addition, data images (i.e., labeled images) may be extracted by filtering the public set of data based on categories. The manual labeling is time-consuming and costly, and requires relevant training of labelling. Generally, the public set of data may contain some common fixed categories and may have errors in labelling. Thus, labor costs are required for cleaning and correcting data. Therefore, how to determine the training data set accurately and automatically is a problem to be solved when training the image recognition model.

Embodiments of the present disclosure provide a solution for training an image recognition model. In this solution, multiple images having similar feature data may be found based on one or several images. In detail, corresponding element feature data may be extracted from a large number of unlabeled images and/or labeled images, to form an index element database. When multiple training images similar to a certain image are needed, the feature data extracted from the certain image may be compared with the large number of element feature data of the index element database to obtain element feature data with a high matching degree. Images related to the element feature data are returned to a user as training images to train the image recognition model. It should be noted that, there is no need to manually label the unlabeled images with the detection frame. Instead, an existing object detection model may be used to label one or more objects of the image with the detection frames. Therefore, the user may quickly and accurately obtain enough labeled images having similar contents of the detection frame by providing or manually labeling a small number of images.

Embodiments will be described in detail with reference to accompanying drawings. FIG. 1 is a schematic diagram illustrating an exemplary environment 100 for implementing embodiments of the present disclosure. As illustrated in FIG. 1, the exemplary environment 100 may include a computing device 110, an input image 120, and an output image 130. In addition, the computing device 110 may include an index element database 140. The input image 120 may be a labeled image inputted by a user, such as, an image at least having a detection frame. The computing device 110 may receive the input image 120 and search for, based on feature data extracted from the input image 120, element feature data that is similar to the feature data, from the index element database 140. The computing device 110 may return the image 130 related to the element feature data as a training image to the user for training the image recognition model. Generally, the output image 130 may have a strong correlation to the input image 120.

It should be understood, due to the existence of known object detection models, the input image 120 in embodiments of the present disclosure may not be limited to a labeled image, which may be an unlabeled image. In other words, when the user inputs an unlabeled image, the computing device 110 may label one or more objects in the image with detection frames (an example of the detection frame will be shown below) based on the known object detection models and may extract feature data in subsequent processes. It should also be understood, same object detection model and same feature extraction service may be used for the unlabeled images inputted by the user and for large number of unlabeled images described above, to perform detection frame annotation and feature data extraction. Details of feature data extraction will be described below.

As illustrated in FIG. 1, generating the output image 130 based on the input image 120 requires to compare the feature data representing a detection frame sub-image of the input image 120 with multiple element feature data of the index element database 140 managed by the computing device 110. Once an element feature data matched to the feature data is searched for, the output image 130 may be determined based on the element feature data, as the training image. The above-mentioned multiple element feature data may be extracted from a large amount of labeled data and/or unlabeled data. For example, an index element database 140 as illustrated in FIG. 1 may be created to store the element feature data to be compared with the feature data. Examples of the exemplary environment 100 will be described in detail below.

Figure 2:
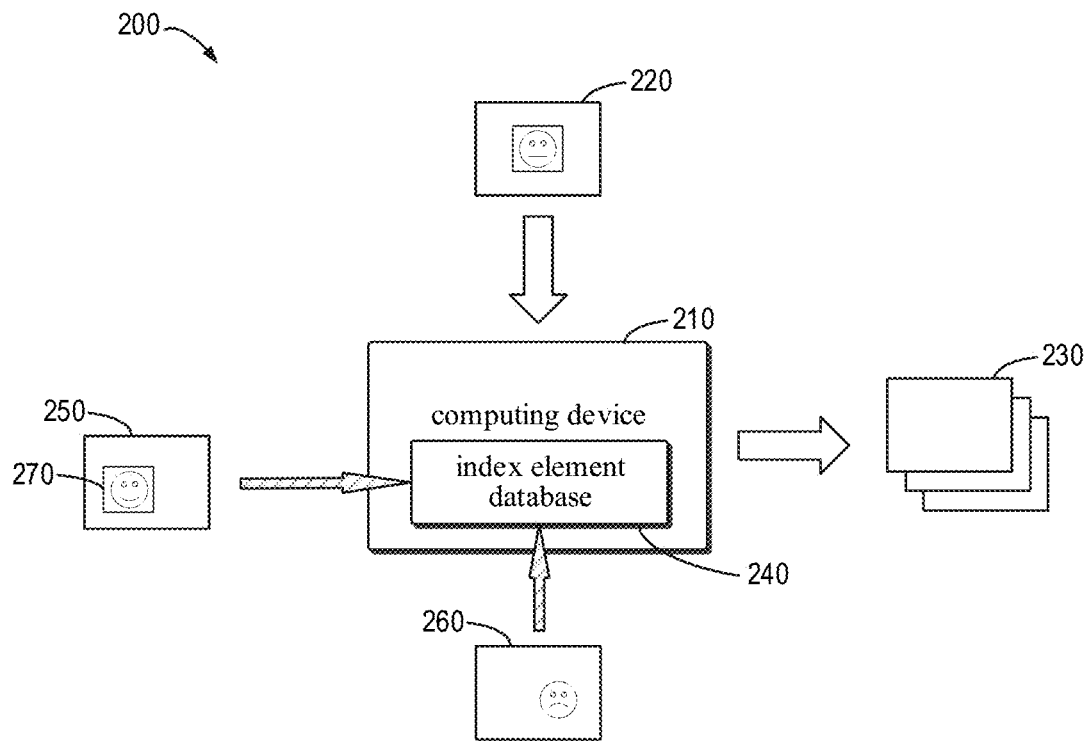
FIG. 2 is a schematic diagram illustrating a detailed exemplary environment according to some embodiments of the present disclosure.

FIG. 2 is a schematic diagram illustrating a detailed exemplary environment 200 according to embodiments of the present disclosure. Like FIG. 1, the exemplary environment 200 may include a computing device 210, an input image 220, and multiple output images 230. The computing device 210 may further include an index element database 240. In addition, the exemplary environment 200 may further include a labeled image 250 and an unlabeled image 260. When the index element database 240 is created, for the labeled image 250, image cutting may be performed based on each detection frame 270 of the image 250 and feature data of each detection frame sub-image may be extracted using a feature service. In addition, for the unlabeled image 260, an existing object detection model or an existing semantic separation model can be used to label one or more objects of the image 260 with the detection frame(s), and image cutting may be performed based on each detection frame of the image 260 to extract feature data of each detection frame sub-image using feature services. It should be understood, each edge of the detection frame 270 illustrated in FIG. 2 may be tangent to the sub-image (such as the expressionless face) to enclose the sub-image, or each edge of the detection frame 270 may be a distance away from the sub-image to enclose the sub-image.

As illustrated in FIG. 2, the input image 220 may be a labeled image inputted by a user, such as, an image at least having a detection frame. The computing device 210 may receive the input image 220 and search for, based on feature data extracted from the input image 220, element feature data that is similar to the feature data, from the index element database 240. In a case where feature data extracted from for example the labeled image 250 and/or unlabeled image 260 is also stored in the index element database 240, when the index element database 240 is created, it may be determined that the feature data of the detection frame sub-image (the expressionless face at the center) of the input image 220 matches the feature data of the detection frame sub-image (the smiley face at the left) of the labeled image 250 and the feature data of the detection frame sub-image (the crying face at the right) of the unlabeled image 260.

The computing device 210 may determine the labeled image 250 and the unlabeled image 260 having the matched feature data based on index information such as mapping information and at least output these two images as the output image 230 for training the image recognition model. It should be noted, the unlabeled image 260 is outputted as a labeled image. It can be seen, the input image 120 and the output images 230 (for example, the images 260 and 260 are outputted as the output images) all contain the faces. That is, the output images 230 generally have strong correlations to the input image 220. The face is merely described as an example in the technical solution described above, and the present disclosure is not limited thereto. It should be understood, other objects, such as a cup, may be used for the object detection. In order to explain the technical solution clearly, the process of training the image recognition model will be described in detail below with reference to FIG. 3.

Figure 3:
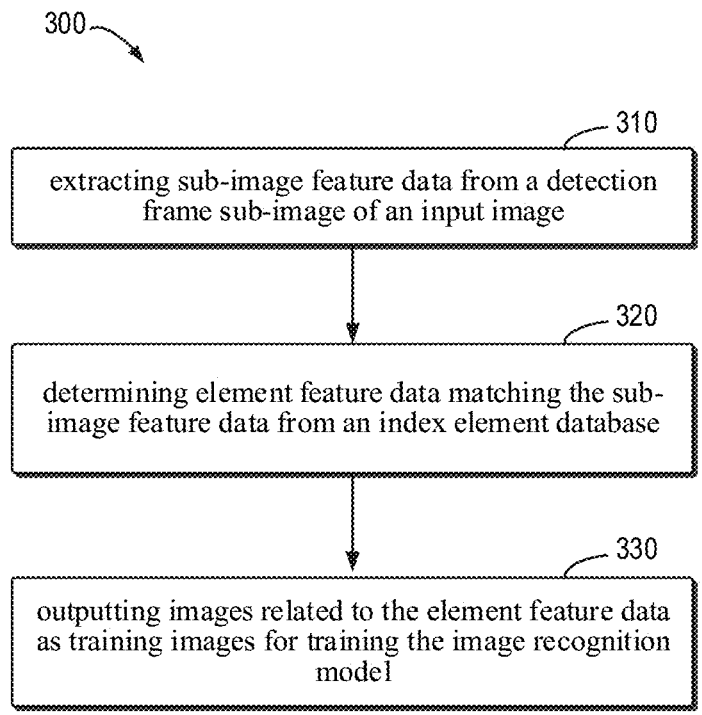
FIG. 3 is a flowchart illustrating a method for training an image recognition model according to embodiments of the present disclosure.

FIG. 3 is a flowchart illustrating a method 300 for training an image recognition model according to embodiments of the present disclosure. The method 300 may be implemented by the computing device 110 of FIG. 1 or the computing device 210 of FIG. 2. Each of these computing devices may be an independent device provided on the server side or the user side. For ease of discussion, the method 300 will be described in combination with FIG. 2.

At block 310, sub-image feature data is extracted from the detection frame sun-image of the input image 220 through the computing device 210. As an example, the input image 220 may be a labeled image. When receiving the input image 220, the computing device 210 may perform image cutting based on each detection frame of the labelled input image 220 and extract the feature data of each detection frame sub-image through a feature service used in creating the index element database 240. In an example, the input image 220 may be an unlabeled image. In this case, when receiving the input image 220, the computing device 210 may use an existing object detection model or an existing semantic separation model to label one or more objects of the input image 220 with detection frame(s), perform image cutting based on each detection frame of the input image 220, and extract the feature data of each detection frame sub-image through the feature service.

In an example, the sub-image feature data extracted may be vectorized. The vectorized feature representation is not in a form of image data, but in a form of a floating-point matrix (one-dimensional). Therefore, when multiple element feature data extracted from multiple candidate images are matched with the extracted sub-image feature data, even if the element feature data that completely matches the extracted sub-image feature data are not found, the element feature data having a high similarity or a high matching rate to the sub-image feature data extracted may be found.

At block 320, the element feature data matching the sub-image feature data is determined from the index element database 240 through the computing device 210. The index element database 240 may be created in advance based on multiple element feature data extracted from multiple candidate images (such as images 250, 260). For example, the sub-image feature data may be compared with the element feature data of the index element database. In response to that a similarity between the sub-image feature data and the element feature data is greater than a predetermined threshold, the element feature data is output. Certainly, if no element feature data having the similarity greater than the predetermined threshold exist, it may indicate that insufficient sample images are stored in the current index element database 240 and the index element database 240 needs to be enlarged. In an example, in a case where the sub-image feature data and the multiple element feature data are vectorized feature data, a similarity between the sub-image feature data and each element feature data of the index element database 240 may be calculated. A predetermined number of element feature data each having a high similarity may be determined as element feature data matching the sub-image feature data. The term "compare" described herein may refer to one-by-one comparison between a single sub-image feature data with each of the multiple element feature data. In addition, a manner of comparing may be based on a vector Euclidean distance or a cosine distance.

Figure 4:
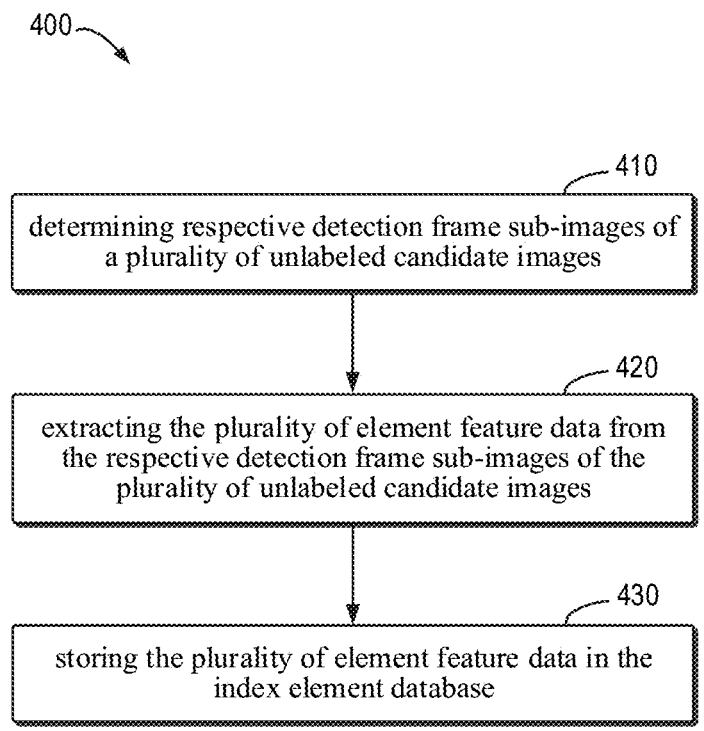
FIG. 4 is a flowchart illustrating a process of extracting and storing feature data of an unlabeled image into an index element database according to embodiments of the present disclosure.

In some examples, in a case where the candidate image that is used as the sample is a labeled image (such as, the image 250 in FIG. 2), creating the index element database 240 may include extracting multiple element feature data from respective detection frame sub-images of multiple labeled candidate images. In addition, the above multiple element feature data may be stored in the index element database 240. Here, forward index, sharding, clustering, and inverted index may be used to improve retrieval efficiency. In some examples, in a case where the candidate image that is used as the sample is an unlabeled image (such as, the image 260 in FIG. 2), and automated image processing may be adopted. FIG. 4 is a flowchart illustrating a process 400 for extracting and storing feature data of an unlabeled image 260 into an index element database 240 according to embodiments of the present disclosure.

At block 410, respective detection frame sub-images of multiple unlabeled candidate images are determined. For example, an existing object detection model may be used to label one or more objects (for example the crying face of FIG. 2) of the image 260 with the respective detection frame. At block 420, multiple element feature data are extracted from the respective detection frame sub-images of the multiple unlabeled candidate images. At block 430, the element feature data are stored in the index element database 240. Therefore, the detection frame of the unlabeled image may be automatically determined, and the feature data of the detection frame may be compared with other feature data, thereby saving cost of manual labeling and gradually improving accuracy of automatic labeling by means of loop iteration.

In an example, during a process of storing the element feature data into the index element database 240, mapping information amongst the element feature data, the respective candidate image and a position of the element feature data in the respective candidate image may be generated. For example, index mapping information such as "feature data-detection frame ID-original image ID-position in original image" may be established. The computing device 210 may search for the candidate image corresponding to the matched element feature data based on the above mapping information.

After describing the process 400 of extracting and storing the feature data of the unlabeled image 260 into the index element database 240, as illustrated in FIG. 3, the description on the method 300 for training the image recognition model is continued. After the element feature data matching the sub-image feature data of the input image 220 is determined, the method 300 proceeds to block 330.

At block 330, the computing device 210 outputs an image 230 related to the element feature data as a training image for training the image recognition model. It should be understood, in order to facilitate the query of the element feature data of the input image 220, in the process of storing the element feature data into the index element database 240, the mapping information amongst the element feature data, the candidate image and the position in the candidate image may be established by the computing device 210. For example, mapping information such as "feature data-detection frame ID-original image ID-position in the original image" may also be established. It should be noted, in order to save a storage space of the index element database 240 and reduce the complexity of the query, the index element database 240 may contain vectorized element feature data, while images related to the element feature data are located in other storage spaces, such as a temporary storage space of the computing device 210 or a network storage space. Therefore, after the matching element feature data is determined, it is necessary to search for the candidate image corresponding to the element feature data.

In some examples, the respective candidate image and the position in the respective candidate image may be determined based on the mapping information. The respective candidate image may be output as the training image. In a case where candidate images corresponding to multiple matching element feature data are same, multiple same candidate images determined may be combined based on the mapping information such as "feature data-detection frame ID-original image ID-position in original image".

Based on embodiments of the present disclosure, the image recognition model may be trained based on the training images obtained in the above embodiments. Based on this image recognition model, image recognition may be performed, thereby realizing functions of the image recognition. For example, in order to identify a certain type of images, the user may input a labeled image into the computing device 210 to obtain multiple (tens to thousands or more) training images based on the above embodiments. Based on these training images, the image recognition model may be further trained based on a deep convolutional neural network for recognizing images similar to the input image.

It is very efficient to obtain training images through the above manners, such that the image recognition model may be trained based on the training images to perform image recognition based on the image recognition model.

Compared with conventional technologies, the technical solution of the present disclosure adopts a processing technology of feature (for example, vector feature) comparison such that a training image set containing similar feature sub-images may be rapidly built with a small number of labeled images. Therefore, cost of manual labeling and time especially for labeling and retrieval of unlabeled data may be greatly reduced. In addition, since the element feature data may be extracted from a large amount of unlabeled data, a large-scale and universal content-based retrieval of images having detection frames may be realized. The object in the detection frame is simple and has obvious features. With the above computing device 110 or 210, problems that text and label index are labelled by mistake or are not labelled may be solved.

Examples of determining one or more candidate images similar to the input image 120 or 220 as the output image 130 or 230 according to element feature data of the index element database 140 or 240 in some example scenarios are discussed above. It should be understood, however, that the descriptions of these scenarios are merely illustrative of the embodiments of the present disclosure. Depending on the actual needs, different strategies can also be selected in different or similar scenarios in order to maximize the accuracy of the output image 130 or 230. It should also be noted, the technical solution of the present disclosure is not limited to be applied to fields of image processing and image recognition. The technical solution of the present disclosure can also have the various advantages mentioned above when applied for other fields that need to retrieve similar data.

Figure 5:
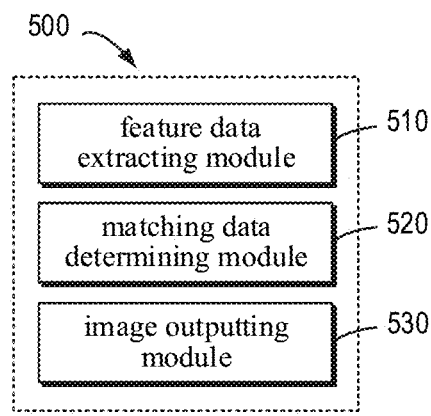
FIG. 5 is a block diagram illustrating a device for training an image recognition model according to embodiments of the present disclosure.

FIG. 5 is a block diagram illustrating a device 500 for training an image recognition model according to embodiments of the present disclosure. The device 500 may be included in the computing device 110 of FIG. 1 or the computing device 210 of FIG. 2, or implemented as the computing device 110 or the computing device 210. As illustrated in FIG. 5, the device 500 may include a feature data extracting module 510, a matching data determining module 520, and an image outputting module 530. The feature data extracting module 510 may be configured to extract sub-image feature data from a detection frame sub-image of an input image. The matching data determining module 520 may be configured to determine element feature data matching the sub-image feature data from an index element database. The index element database is created in advance based on multiple element feature data extracted from multiple candidate images. The image outputting module 530 may be configured to output an image related to the element feature data as a training image to train an image recognition model.

In some examples, the feature data extracting module 510 may be further configured to extract multiple element feature data from the detection frame sub-images of multiple labeled candidate images. In addition, the device 500 may further include a feature data storage module (not illustrated). The feature data storage module may be configured to store the multiple element feature data into the index element database.

In some example, the device 500 may further include a detection frame determining module (not illustrated). The detection frame detecting module may be configured to determine the detection frame sub-images of the multiple unlabeled candidate images. For example, the feature data extracting module 510 may be further configured to extract the element feature data from the detection frame sub-images of the multiple unlabeled candidate images. The device 500 may further include a feature data storage module (not illustrated). The feature data storage module may be configured to store the element feature data into the index element database.

In some examples, the device 500 may further include a mapping information generation module (not illustrated). The mapping information generation module may be configured to generate mapping information amongst the element feature data, the candidate image and a position in candidate image.

In some examples, the image outputting module 530 may include a position determination module (not illustrated) and a training image outputting module (not illustrated). The position determination module may be configured to determine the candidate image and the position in the candidate image based on the mapping information. The training image outputting module may be configured to output the candidate image as the training image.

In some examples, the matching data determining module 520 may include a feature data comparison module (not illustrated) and a feature data outputting module. The feature data comparison module may be configured to compare the sub-image feature data with the element feature data in the index element database. The feature data outputting module may be configured to, in response to that a similarity between the sub-image feature data and the element feature data is greater than a predetermined threshold, output the element feature data.

In some examples, the sub-image feature data and the multiple element feature data may be feature vectors. The matching data determining module 520 may include a similarity calculating module (not illustrated) and a similarity ranking module (not illustrated). The similarity calculating module may be configured to calculate a similarity between the sub-image feature data and each element feature data of the index element database. The similarity ranking module may be configured to determine a predetermined number of the element feature data each having a high similarity as the element feature data matching the sub-image feature data.

According to embodiments of the present disclosure, the image recognition model may be trained based on the obtained training images. Based on this image recognition model, image recognition may be performed, and a device for image recognition may be constructed. For example, in order to identify a certain type of images, the user may input a labeled image into the above device 500, to obtain multiple (tens to thousands or more) training images based on the above embodiments. Based on these training images, the image recognition model may be further trained based on the deep convolutional neural network for recognizing images similar to the above input image.

Figure 6:
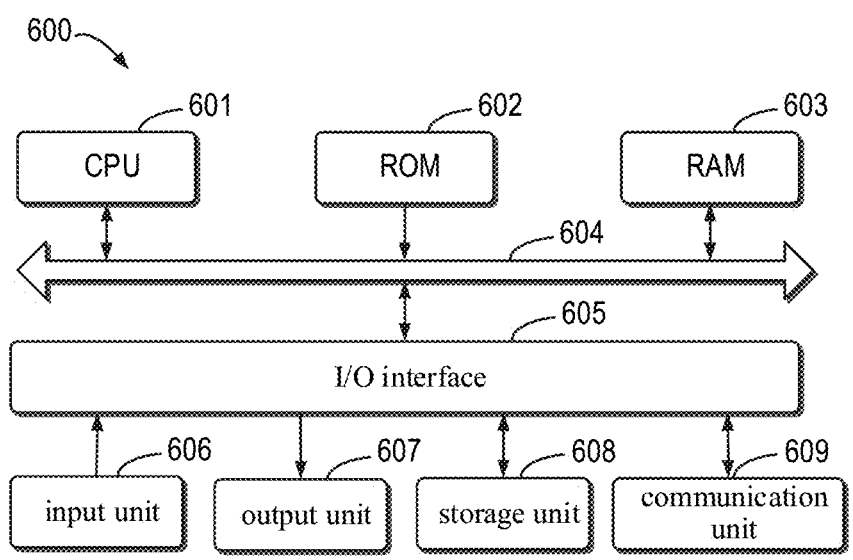
FIG. 6 is a block diagram illustrating a computing device capable of implementing embodiments of the present disclosure.

FIG. 6 is a block diagram illustrating an exemplary device 600 capable of implementing embodiments of the present disclosure. The device 600 is configured to implement the computing device 110 of FIG. 1 or the computing device 210 of FIG. 2. As shown, the device 600 includes a central processing unit (CPU) 601 to perform various appropriate actions and processes according to computer program instructions stored in a read only memory (ROM) 602, or loaded from a storage unit 608 into a random access memory (RAM) 603. In the RAM 603, various programs and data required for the operation of the storage device 600 can also be stored. The CPU 601, the ROM 602, and the RAM 603 are connected to each other through a bus 604. An input/output (I/O) interface 605 is also connected to the bus 604.

Components in the device 600 are connected to the I/O interface 605, including: an input unit 606, such as a keyboard, a mouse; an output unit 607, such as various types of displays, speakers; a storage unit 608, such as a disk, an optical disk; and a communication unit 609, such as network cards, modems, wireless communication transceivers, and the like. The communication unit 609 allows the device 600 to exchange information/data with other devices through a computer network such as the Internet and/or various telecommunication networks.

The computing unit 601 performs various methods and processes described above, such as the methods 300 and 400. For example, in some embodiments, the methods 300 and 400 may be implemented as computer software programs that are tangibly embodied on a machine-readable medium, such as the storage unit 608. In some embodiments, part or all of the computer program may be loaded and/or installed on the device 600 via the ROM 602 and/or the communication unit 609. When a computer program is loaded into the RAM 603 and executed by the CPU 601, one or more steps of the methods 300 and 400 described above may be performed. Alternatively, in other embodiments, the CPU 601 may be configured to perform the method 300 in any other suitable manner (e.g., by means of firmware).

The functions described above herein may be performed, at least in part, by one or more hardware logic components. For example, unlimitedly, exemplary types of hardware logic components that may be used include: Field Programmable Gate Array (FPGA), Application Specific Integrated Circuit (ASIC), Application Specific Standard Product (ASSP), System on Chip (SOC), Load programmable logic device (CPLD) and so on.

Program code for implementing the methods of the present disclosure may be written in any combination of one or more programming languages. These program codes may be provided to a processor or controller of a general computer, a dedicated computer, or other programmable data processing device, such that the program codes, when executed by the processor or controller, cause the functions and/or operations specified in the flowcharts and/or block diagrams is performed. The program code can be executed entirely on the machine, partly on the machine, as a stand-alone software package partly on a machine and partly on a remote machine or entirely on a remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

Furthermore, although the operations are depicted in a particular order, this should be understood as requiring that such operations be performed in the shown particular order or in sequential order, or that all illustrated operations be performed to achieve the desired result. Under certain circumstances, multitasking and parallel processing may be advantageous. Likewise, although several specific implementation details are included in the discussion above, these should not be construed as limiting the scope of the disclosure. Certain features that are described in the context of separate embodiments can also be implemented in combination in a single implementation. Conversely, various features that are described in the context of a single implementation can also be implemented in multiple implementations individually or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms for implementing the claims.

What is claimed is:

1. A method for training an image recognition model, comprising:
   extracting sub-image feature data from a detection frame sub-image of an input image;
   determining element feature data matching the sub-image feature data from an index element database, wherein the index element database is built in advance based on a plurality of element feature data extracted from a plurality of candidate images; and
   outputting images related to the element feature data based on mapping information stored in the index element database as training images for training the image recognition model;
   wherein building the index element database further comprises: determining respective detection frame sub-images of the plurality of candidate images; extracting the plurality of element feature data from the respective detection frame sub-images; and generating the mapping information amongst the element feature data, the respective candidate images and positions in the respective candidate images.

2. The method according to claim 1, wherein building the index element database comprises:
   extracting the plurality of element feature data from respective detection frame sub-images of a plurality of labeled candidate images; and storing the plurality of element feature data in the index element database.

3. The method according to claim 2, wherein the sub-image feature data and the plurality of element feature data are feature vectors, and determining the element feature data matching the sub-image feature data from the index element database comprises:
calculating a similarity between the sub-image feature data and each element feature data of the index element database; and
determining a predetermined number of the element feature data each having a high similarity as the element feature data matching the sub-image feature data.

4. The method according to claim 1, wherein building the index element database comprises:
determining respective detection frame sub-images of a plurality of unlabeled candidate images;
extracting the plurality of element feature data from the respective detection frame sub-images of the plurality of unlabeled candidate images; and
storing the plurality of element feature data in the index element database.

5. The method according to claim 4, wherein the sub-image feature data and the plurality of element feature data are feature vectors, and determining the element feature data matching the sub-image feature data from the index element database comprises:
calculating a similarity between the sub-image feature data and each element feature data of the index element database; and
determining a predetermined number of the element feature data each having a high similarity as the element feature data matching the sub-image feature data.

6. The method according to claim 1, wherein outputting the images related to the element feature data as the training images, comprises:
for each element feature data, determining a candidate image and a position in the candidate image based on the mapping information; and
outputting the candidate image as the training image.

7. The method according to claim 1, wherein determining the element feature data matching the sub-image feature data from the index element database comprises:
comparing the sub-image feature data with the element feature data of the index element database; and
in response to that a similarity between the sub-image feature data and the element feature data is greater than a predetermined threshold, outputting the element feature data.

8. An electronic device, comprising:
one or more processors; and
a storage device, configured to store one or more programs, wherein when the one or more programs are executed by the one or more processors, the one or more processors are caused to:
extract sub-image feature data from a detection frame sub-image of an input image;
determine element feature data matching the sub-image feature data from an index element database, wherein the index element database is built in advance based on a plurality of element feature data extracted from a plurality of candidate images; and
output images related to the element feature data based on mapping information stored in the index element database as training images for training the image recognition model;
wherein building the index element database further comprises: determining respective detection frame sub-images of the plurality of candidate images; extracting the plurality of element feature data from the respective detection frame sub-images; and generating the mapping information amongst the element feature data, the respective candidate images and positions in the respective candidate images.

9. The electronic device according to claim 8, wherein the one or more processors are caused to build the index element database by:
extracting the plurality of element feature data from respective detection frame sub-images of a plurality of labeled candidate images; and storing the plurality of element feature data in the index element database;
or
determining respective detection frame sub-images of a plurality of unlabeled candidate images; extracting the plurality of element feature data from the respective detection frame sub-images of the plurality of unlabeled candidate images; and storing the plurality of element feature data in the index element database.

10. The electronic device according to claim 9, wherein the sub-image feature data and the plurality of element feature data are feature vectors, and
the one or more processors are configured to determine the element feature data matching the sub-image feature data from the index element database by:
calculating a similarity between the sub-image feature data and each element feature data of the index element database; and
determining a predetermined number of the element feature data each having a high similarity as the element feature data matching the sub-image feature data.

11. The electronic device according to claim 8, wherein the one or more processors are caused to output images related to the element feature data as the training images by:
for each element feature data, determining a candidate image and a position in the candidate image based on the mapping information; and
outputting the candidate image as the training image.

12. The electronic device according to claim 8, wherein the one or more processors are configured to determine the element feature data matching the sub-image feature data from the index element database by:
comparing the sub-image feature data with the element feature data of the index element database; and
in response to that a similarity between the sub-image feature data and the element feature data is greater than a predetermined threshold, outputting the element feature data.

13. A non-transitory computer-readable storage medium, having a computer program stored thereon, wherein when the computer program is executed by a processor, a method for training an image recognition model is implemented, the method comprising:
extracting sub-image feature data from a detection frame sub-image of an input image;
determining element feature data matching the sub-image feature data from an index element database, wherein the index element database is built in advance based on a plurality of element feature data extracted from a plurality of candidate images; and
outputting images related to the element feature data based on mapping information stored in the index element database as training images for training the image recognition model;

wherein building the index element database further comprises: determining respective detection frame sub-images of the plurality of candidate images; extracting the plurality of element feature data from the respective detection frame sub-images; and generating the mapping information amongst the element feature data, the respective candidate images and positions in the respective candidate images.

14. The non-transitory computer-readable storage medium according to claim 13, wherein building the index element database comprises:

extracting the plurality of element feature data from respective detection frame sub-images of a plurality of labeled candidate images; and storing the plurality of element feature data in the index element database;

or determining respective detection frame sub-images of a plurality of unlabeled candidate images; extracting the plurality of element feature data from the respective detection frame sub-images of the plurality of unlabeled candidate images; and storing the plurality of element feature data in the index element database.

15. The non-transitory computer-readable storage medium according to claim 13, wherein outputting the images related to the element feature data as the training images, comprises:

for each element feature data, determining a candidate image and a position in the candidate image based on the mapping information; and outputting the candidate image as the training image.

* * * * *